United States Patent Office 3,049,985
Patented Aug. 21, 1962

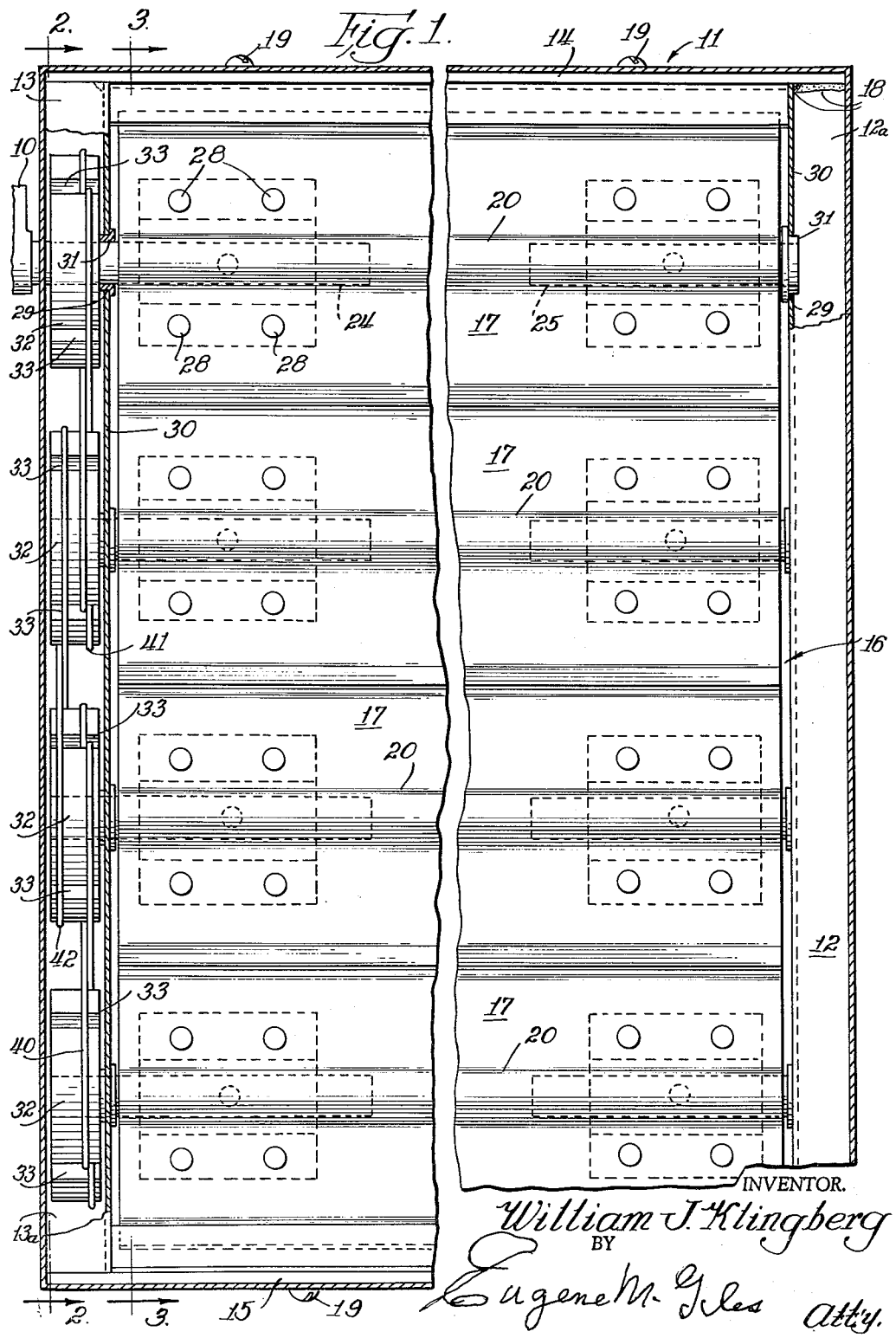

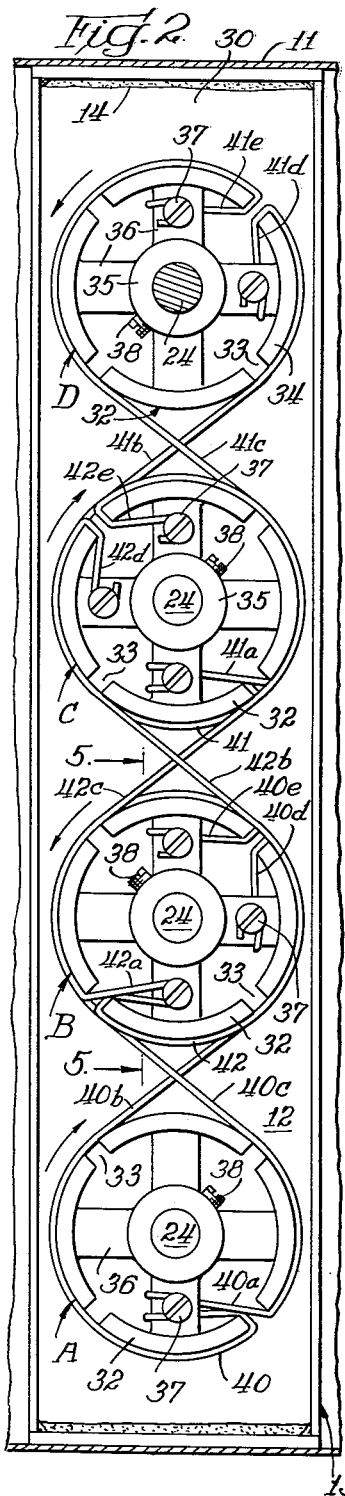

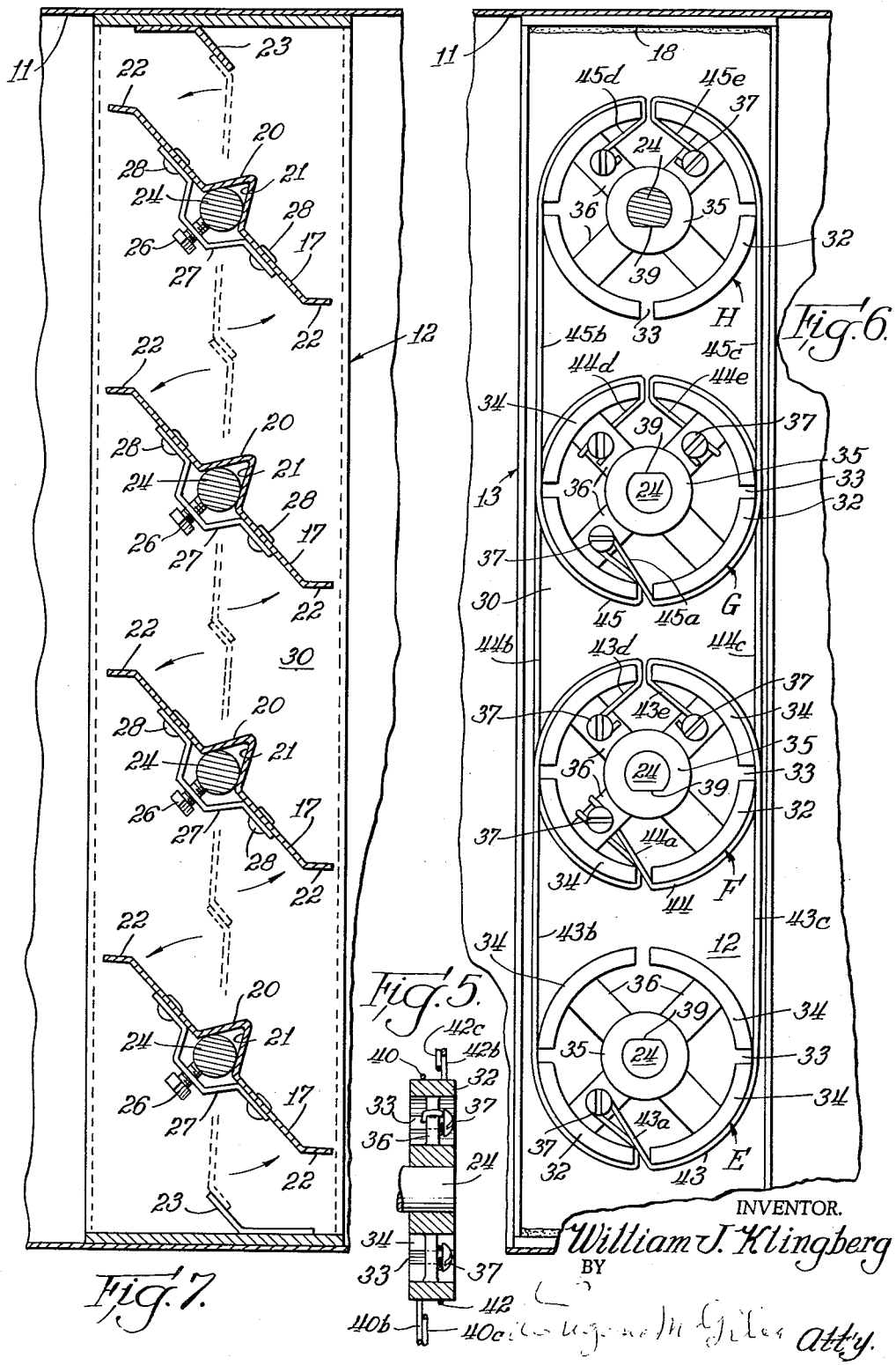

3,049,985
LOUVER TYPE DAMPER
William J. Klingberg, Bloomington, Ill., assignor to American Foundry & Furnace Company, Bloomington, Ill., a corporation of Illinois
Filed Jan. 19, 1959, Ser. No. 787,522
4 Claims. (Cl. 98—110)

This invention relates to a louver assembly wherein a series of pivoted louvers are conjointly operable to open and closed positions to provide damper control of a passage such, for example, as the passage through the air duct of a heating, ventilating or air conditioning system, and has reference more particularly to facilities for operating such louvers and the incorporation thereof in the louver supporting frame to provide a simple and compact assembly installable as a unit in such air duct or the like.

The principal objects of the invention are to provide an improved damper of louvered type; to insure balanced movement and uniform ease of operation of the louvers with minimum effort throughout the range of opening and closing movement thereof; to facilitate application thereto of a common operator and insure positive corresponding movement of all the louvers and at a constant ratio to that of the common operator; to avoid the presence of any louver operating mechanism in the path of circulation through the louvers; to localize the louver operating facilities in a compact grouping thereof at an isolated place of convenient access for assembly thereof; to utilize a structural part of the louver supporting frame to house and support the louver operating mechanism without need of extra parts therefor; to provide improved connections for imparting conjoint movement to the louvers; to provide adaptability for either parallel or opposed movement by a simple change of connections; and to utilize standardized louver operating elements with which any desired number of louvers are readily connectible for conjoint operation, these and other objects being accomplished as pointed out more particularly hereinafter and as shown in the accompanying drawings, in which:

FIG. 1 is a front view of a four louver damper unit made in accordance with the present invention and located in a duct which is shown in section, the unit having an intermediate portion of the width and lower corner portion thereof broken away and some of the parts thereof shown in section;

FIG. 2 is a view taken on the line 2—2 of FIG. 1 and shows the left hand extremity of the unit as prepared for assembly in a duct;

FIG. 3 is a vertical sectional view taken on the line 3—3 of FIG. 1 and shows the louvers in closed position;

FIG. 4 is a view similar to FIG. 3 but showing the louvers in partly open position;

FIG. 5 is a sectional view of the second rotor from the bottom of FIG. 2, taken on the line 5—5 thereof;

FIG. 6 is a view similar to that of FIG. 2 with a modified form of connection thereof for parallel rotation of the louvers; and FIG. 7 is a view showing a series of louvers similar to those of FIG. 3 as arranged for operation by the parallel connected rotors of FIG. 6 and showing in full lines the louvers partly open, with broken lines indicating the closed position thereof.

The damper unit of this invention may be employed in any place and for any purpose for which it is suitable and may be made with any desired number of louvers, a four louver unit being shown herein in FIGS. 1, 2 and 3 for purposes of illustration, and installed in a rectangular duct, which is indicated at 11, and may be, for example, a duct of a heating, ventilating, air conditioning system, or the like, through which air circulates and is controllable by the damper unit.

The louvers and operating mechanism therefor are mounted in a rectangular marginal frame which fits within the duct 11 and is composed of a pair of corresponding laterally spaced upright side members 12 and 13 of outwardly facing channel form which have shallow channels 12a and 13a respectively therein and are secured together at their upper and lower ends by top and bottom plates 14 and 15 respectively and conjointly with said plates define an opening 16 within which the four louvers 17 are located.

Preferably the plates 14 and 15 extend onto the ends of the channel members 12 and 13 and close the ends of the channels 12a and 13a and the plates 14 and 15 are secured to the channel ends in any manner which will provide a rigid rectangular frame, as for example, by welding, as at 18, and this frame may be secured in the duct 11 in any desired manner, as for example by screws 19 engaged in openings of the top and bottom walls of the duct 11 and threaded into the top and bottom plates 14 and 15 of the frame, and when thus installed the outer sides of the channels 12a and 13a are closed by the side walls of the duct.

The louvers 17 are alike and each comprises a sheet metal plate formed at its midwidth with a hollow V-shaped rib to extend from end to end thereof for reinforcing and providing a V-shaped groove 21 for shaft reception, and each said plate has oppositely inclined marginal portions 22 for engagement with those of the next adjoining louvers or with top and bottom angular stop strips 23 when the louvers are closed, as shown in FIG. 3.

Each louver plate has a stub shaft secured thereto at each end for pivotal mounting thereof, the shaft at one end being indicated at 24 and at the other end at 25, these shafts being clamped in the V-shaped groove 21 by set screws 26 threaded through the top of bridging plates 27 which straddle the V-shaped groove 21 at the louver ends and are riveted to the louver plate as at 28.

The shafts 24 and 25 seat in the groove 21 to such depth that the axis of rotation of said shafts is at least substantially at the center of gravity of the louver so that the latter rotates freely without unbalance, and by reason of the seating of the shafts in the groove 21 alignment of the shafts is assured and by reason of the set screw clamping thereof the shafts may be readily adjusted lengthwise and also circumferentially if necessary.

With short louvers, a single shaft may be employed instead of two shafts 24 and 25 and a single central clamping plate 27 may be employed instead of the two plates 27.

The shafts 24 and 25 project beyond the ends of the louvers through bearing openings 29 in the web portions 30 of the respective side channels 12 and 13 of the frame, the bearing openings 29 being preferably provided with self lubricating bearings 31, and the bearings are located in line at the midwidth of the respective channel iron webs 30 and in pairs suitably spaced apart so that the inclined margins 22 of adjoining plates overlap and the inclined margins of the end louvers engage the stop strips 23 when the louvers are in the closed position.

The shafts 24 project outwardly beyond the web 30 of the channel member 13 for reception of rotors 32 thereon by which the louvers are operated and any one of these shafts, for example the upper one, projects beyond the others out through the side wall of the duct 11 for attachment thereto of means by which power is applied for operating the louvers, a fragmentary portion of a crank being indicated at 10 in FIG. 1.

The rotors 32 are all alike and of spoked wheel type having a broad faced rim interrupted at quarter turn intervals by slots 33 extending thereacross so that the wheel rim is comprised of four segments 34 and each segment is connected to the wheel hub 35 by a separate wide faced spoke 36, some of which spokes are provided, as explained hereafter, with threaded openings for reception of headed screws 37, and these spokes 36 are of such thickness that the rim segments 34 extend a substantial distance therebeyond at each side of the rotor, as indicated in FIG. 5.

These wheels, which are readily made by casting or molding and provide standardized operating elements for the louvers at low cost, may be secured to their respective shafts 24 in any convenient manner, as for example, by set screws 38, as shown in FIG. 2, or the shafts may have their outer ends flat sided, as indicated at 39 in FIG. 6, and the wheels may have a center opening corresponding to the flat sided shape of the shaft to provide a slip on engagement by which the shaft is keyed to the wheel to rotate therewith. Plastic wheels may be employed and molded onto the shaft ends, which are preferably knurled or fluted for interlock of the plastic wheels therewith.

These wheels are connected to one another by flexible cables which pass part way around the wheels or rotors 32, or in some cases entirely therearound, and are led through the slots 33 and anchored to the set screws 37, and these cables may be arranged on the wheels for parallel movement of the louvers 17 or for opposed movement thereof.

For such opposed movement, the cables may be arranged as shown in FIGS. 1 and 2, in which the wheels are shown in the position that they occupy when the louvers 17 are in the closed position of FIG. 3, and it is to be understood that the wheels may be adjusted to such positions relatively to their respective louvers either by the set screw 38 fastening of the wheel to the shaft 24 or by the set screw 36 clamping of the respective shaft 24 in the channel 20 of the louver by the set screws 26.

According to FIGS. 1 and 2 a separate cable is employed for each adjoining pair of rotors or wheels 32 and thus the bottom rotor and the one next above are connected by one cable length and the two middle rotors are connected by another cable length and the top rotor and the one next below are connected by still another cable length and, as explained hereinafter, the cables are arranged on the wheels or rotors so that there is no cable interference on the wheels or rotors which have two cables thereon.

For convenience in explanation of the cable arrangement the wheels or rotors are identified consecutively from the bottom in FIG. 2 as A, B, C and D and the cable 40 which connects the lower rotor A with the rotor B next above has an intermediate loop portion 40$^a$ brought in through the lower right hand slot 33 of rotor A and engaged around a set screw 37 of the bottom spoke 36 and has two parts 40$^b$ and 40$^c$ extending out through the slot 33, the part 40$^b$ of which is trained across the bottom and on the left side of rotor A and crossed over to the next above rotor B and trained on the right side thereof to the upper right hand slot 33 of rotor B where the end portion 40$^d$ of the cable part 40$^b$ is brought in through said slot 33 and secured by a set screw 37 to the right hand spoke of rotor B.

The other part 40$^c$ of cable 40 is trained on the right side of rotor A and crossed over to the left side of rotor B and trained on the left side thereof and over the top to the same slot 33 through which the end portion 40$^d$ enters, and has the end portion 40$^e$ thereof brought through said slot to the top spoke 36 of the rotor B and secured thereto by a screw 37.

A cable 41 connects the rotors C and D in exactly the same manner as the cable 41 connects the rotors A and B and has a loop portion 41$^a$ and parts 41$^b$ and 41$^c$ and ends 41$^d$ and 41$^e$ connected and arranged in exactly the same manner as the loop 40$^a$, parts 40$^b$ and 40$^c$ and ends 40$^d$ and 40$^e$ of the cable 40, and it is to be noted particularly that in the case of the loops 40$^a$ and 41$^a$ and the ends 40$^d$, 40$^e$, 41$^d$ and 41$^e$, they are all brought in at the rear of the respective spokes 36 to which they are attached and bent around the spoke from the rear to the front for fastening thereof by the screws 37.

By reason thereof, the parts 40$^b$, 40$^c$, 41$^d$ and 41$^e$ come out through the slots 33 in a plane substantially coincidental with the rear of the spokes 36 and by reason thereof the cables 40 and 41 are trained about the rear portions of the faces of the rotors A, B, C and D, which is advantageous for reasons explained hereafter.

Moreover, the fastening of all the cables to the spokes is by screws located at the front of the rotors where they are readily accessible.

The cable 42 which connects the rotors B and C has a loop portion 42$^a$ which is also connected by a screw 37 to the bottom spoke of the rotor B, but said loop is brought in through the lower left hand slot 33 of said rotor 32, and the part 42$^d$, unlike the parts 40$^b$ and 41$^b$, is trained under the bottom of rotor B and up the right side thereof and crossed over to the left side of rotor C and thereon to the upper left slot 33 of rotor C, and has the end portion 42$^d$ thereof secured by a screw 37 to the left hand spoke 36 of rotor C, and the part 42$^c$ is trained up the left side of rotor B and crossed over to the right side of rotor C and over the top thereof to said upper left slot 33 of rotor C and has the end portion 42$^e$ thereof secured by a screw 37 to the top spoke 36 of rotor C.

Thus the parts 42$^b$ and 42$^c$ of cable 42 are arranged reversely to the corresponding parts 40$^b$ and 41$^b$ and 40$^c$ and 41$^c$ of cables 40 and 41.

Moreover, the loop 42$^a$ and ends 42$^d$ and 42$^e$ are brought in through the slots 33 directly to the front of the spokes 36 to which they are secured and by reason thereof the parts 42$^e$ and 42$^d$ come out of their slots in a plane substantially coincidental with the front faces of the spokes 36 and are thus trained about front portions of the faces of the rotors B and C and spaced safely from the portions of cables 40 and 41 on said rotors B and C as said portions of cables 40 and 41 are on the rear portion of the faces of rotors B and C, as explained above, whereby they do not interfere or conflict with the operation of cable 41.

The rotors A, B, C and D have only a quarter turn rotation in the operation of the louvers 17 and with the above described arrangement of the cables 40, 41 and 42, the fastened loop and end portions thereof merely move a quarter turn at the top or bottom of the rotors with ample portions thereof trained on the periphery of the rotors at all times so that there is no undue strain on any of the connections and there is no undue bending of the cables at any time.

Obviously, if only two louvers are employed, only one cable is required and each additional louver requires an additional rotor 32 and connection thereof to the preceding rotor, and it is to be understood that the cables are brought into the slots 33 alternately at the front of the spokes 36 and at the rear thereof so that the portions of two cables on the same rotor are separated sufficiently to avoid interference with one another.

A connection of the rotors for parallel operation of the louvers is shown in FIGS. 6 and 7, in FIG. 6 of which the rotors 32 are, for the purpose of explanation, designated in order from the bottom as E, F, G and H, and the three cables 43, 44 and 45 thereof have intermediate loop portions 43$^a$, 44$^a$ and 45$^a$ and end portions 43$^d$, 43$^e$, 44$^d$, 44$^e$, 45$^d$ and 45$^e$ connected to the rotors 32 in the same manner as the loop portions and end portions of the cables in FIG. 2.

The portions 43$^b$, 43$^c$, 44$^b$, 44$^c$, 45$^b$ and 45$^c$ of the cables 43, 44 and 45 extend directly between their connected rotors instead of being crossed over thereto as in the case of the cables of FIG. 2, and thus the part 43$^b$ of cable 43 extends directly from the left side of rotor E to the right side of rotor E and has its end portion 43$^d$ connected to the upper left spoke 36 of rotor F and the part 43$^c$ of cable 43 extends directly from the left side of rotor F to the right side of rotor F and has its ends 43$^e$ connected to the upper right spoke 36 of rotor F and in like manner the cable parts 44$^b$ and 44$^c$ connect the rotor F to the rotor G and the cable parts 45$^b$ and 45$^c$ connect the rotor G to the rotor H, except that the cable 44 has its loop portion 44$^a$ and end portions 43$^d$ and 43$^e$ brought in behind the spokes 36 and the cable 44 is thus trained on the rear portion of the peripheral faces of the rotors F and G whereas the loops 43$^a$ and 45$^a$ and their ends 43$^d$ and 43$^e$ and 45$^d$ and 45$^e$ are brought in at the front of spokes 36 to avoid interference of portions of two cables on the same rotor.

Thus with the same rotors and the same cables, except as to a slight difference in length, the louvers of the same unit may be connected optionally for either opposed or parallel rotation of the louvers, and adjustments may be readily made of individual louvers to assure matching co-operation thereof, and the louver operating facilities are compactly grouped at a place and in a manner in which the connections are freely accessible, and exactly corresponding rate of movement is imparted conjointly to all the louvers.

A single cable may be employed for connecting all of the rotors, if desired, instead of a separate cable between each pair. For example, for parallel operation of the rotors, a single cable may be connected at one end to the top rotor H of FIG. 6 in the same manner as the end portion 45$^d$ is connected thereto in FIG. 6 and then brought straight down at the left side of all the rotors and looped entirely around the intermediate rotors G and F and around the bottom half of the bottom rotor E to the right side thereof and then directly upon and past the right side of rotors F and G to the top rotor to which the other end of said cable is connected through the top slot 33 thereof to a spoke 36.

In such case the portions of the cable extending around the rotors F and G are looped through an appropriate slot 33 and the loop secured by a screw 37 to a spoke of the rotor and likewise the portion extending around the bottom of the rotor E is looped through the bottom slot of that rotor and secured by a screw 37 to a spoke of that rotor E and the portion of the cable at the right of the rotors is connected only to the top and bottom rotor H and E and has no connection with the intermediate rotors F and G, and the connections of the portion of the cable at the left side of the rotors is through the slots 33 thereof to the front of a spoke and the connections of the portions of the cable at the right of the rotors to the top and bottom rotors H and G are made so that the connection portions extend outward through the slot 33 from the rear of a spoke so that the cable portion at the right of the rotor extends along the rear portion of the width of the peripheral faces of the rotors whereas the connections from the cable portion at the left of the rotors are made through the slots 33 directly to the front of the spokes whereby the cable portions which extend around the rotors are on the front portion of the width of the peripheral faces of the rotors.

Any one of the shafts 24 or even the shafts 25 may be extended for application of power thereto, either manual or by motor, and as the opening and closing movement of the louvers corresponds to the turning of the extended shaft by which power is applied, the amount of turning of said shaft is a reliable index as to the extent of the opening or closing of the louvers.

While I have shown and described my invention in a preferred form, I am aware that various changes and modifications may be made therein without departing from the principles of the invention, the scope of which is to be determined by the appended claims.

What is claimed is:

1. In a louver assembly for use with heating and ventilating type ducts, a frame adapted for insertion into said duct, said frame including spaced apart side members at least one of which has an outwardly facing channel, separate shaft means supporting said louvers and extending into said channel, and a rotor carried by each said shaft means and positioned in said channel, and a separate cable interconnecting each adjacent pair of rotors for simultaneous rotation, each rotor including a plurality of segments having arms extending inwardly therefrom toward the center of the rotor, said segments defining a generally circular running surface for said cable while providing spaces between the segments, the cable for each adjacent pair of rotors having a portion thereof led through a space between segments of one rotor and secured to one of said arms of that rotor, while another portion of such cable is led through the space between segments in the other rotor of said pair and secured to one of said arms of that rotor.

2. The structure of claim 1 wherein the strands of the cable leading from one rotor to the other are crossed between the rotors so as to provide opposite directions of rotation of adjacent rotors.

3. The structure of claim 1 wherein the cable for adjacent rotors is wound about each rotor in the same direction so as to provide rotation of the rotors and rotation of the louvers in the same direction upon rotation of one of the rotors.

4. The structure of claim 1 wherein the cables interconnecting adjacent pairs of rotors are staggered relative to one another so as to avoid fouling of the cables during operation of the rotors.

References Cited in the file of this patent

UNITED STATES PATENTS

| | | |
|---|---|---|
| 1,482,435 | Jenkins | Feb. 5, 1924 |
| 1,751,658 | Ready | Mar. 25, 1930 |
| 1,878,190 | Scofield | Sept. 20, 1932 |
| 1,904,654 | Ellison | Apr. 18, 1933 |
| 1,926,120 | Shediker | Sept. 12, 1933 |
| 2,040,893 | Young | May 19, 1936 |
| 2,303,254 | Bules | Nov. 24, 1942 |
| 2,331,758 | Barnett | Oct. 12, 1943 |
| 2,853,935 | Crowle | Sept. 30, 1958 |
| 2,863,374 | Hinden | Dec. 9, 1958 |